May 30, 1967   K. F. DEWING ETAL   3,321,907
TAINTER GATE HOIST CHAIN AND METHOD OF PROVIDING THE SAME
Filed Feb. 18, 1965
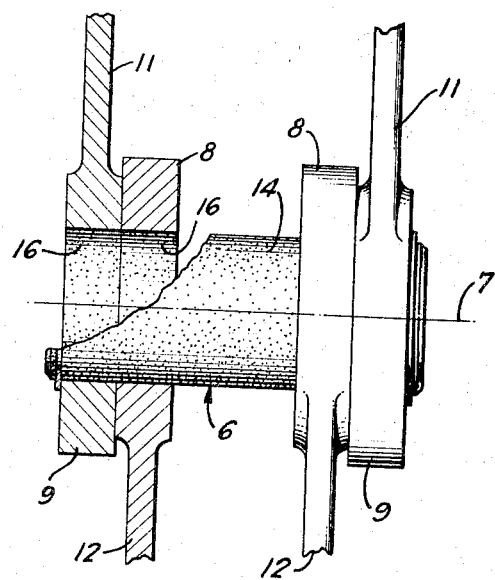
INVENTORS
KENNETH F. DEWING
BY   MANUEL C. CHRISTO
Lothrop & West
ATTORNEYS

United States Patent Office

3,321,907
Patented May 30, 1967

3,321,907
TAINTER GATE HOIST CHAIN AND METHOD
OF PROVIDING THE SAME
Kenneth F. Dewing, Orinda, and Manuel C. Christo, Benicia, Calif., assignors to Yuba Consolidated Industries, Inc.
Filed Feb. 18, 1965, Ser. No. 433,855
7 Claims. (Cl. 59—8)

Our invention relates primarily to a special kind of chain and to making a tainter gate hoist chain effective to operate satisfactorily under the stringent conditions of operation which have heretofore made many chains for the same purpose fail in service.

In many hydraulic projects, particularly reclamation projects, the flow from a lake or from a comparable water body is controlled by one or more tainter gates. These are usually arcuate barriers arranged on a frame to pivot about a horizontal axis so that the amount of water flow can be controlled by lifting or lowering the gate. For controlling such gates, which often weigh many tons, the gate is largely supported by relatively heavy chain made up of pins and side links. The chains pass over actuating sprockets suitably motor driven. In this service, the tainter gate may not have any actuation whatsoever for long periods; for example, even weeks or months during a dry spell. At other seasons of the year, when the water release must be very carefully controlled, the tainter gate chain is utilized very frequently, perhaps several times an hour. During this latter operation, the entire chain is not usually subject to flexing since only a very small part of its length is in engagement with the driving sprocket. In some installations, because of the varying water level, part of the chain is sometimes immersed in water and at other times is exposed to the air. The requirement is for uniform flexibility in the chain and the immediate ability to serve properly whenever called upon despite protracted periods of nonuse under the gate load. Difficulty has heretofore been encountered in that during periods of nonuse the immobile load of the tainter gate on the chain causes portions of the chain to cohere. That is to say, the pins and links tend to rub and gall until they virtually fuse, so that the chain is no longer flexible and cannot be relied upon for instant operation. This happens very quickly even with new chains. Various experiments with different construction techniques, with different materials, with different lubricants and with different loadings have not heretofore been successful. Resort has necessarily been had to a much larger, heavier and more expensive form of chain. In this, the links and pins are not in direct engagement, but intervening bushings of bearing material such as bronze are utilized. While this is functionally successful, it is costly not only because of the added material and labor for providing the bronze bushings, but also because the permitted loading on the bearing material, especially if it is a high lead bronze, is low. The bushings must be made of large size and to receive them the pins and links must be greatly enlarged.

It is therefore an object of our invention to provide a satisfactorily operating, relatively inexpensive, relatively small size tainter gate hoist chain.

Another object of the invention is to provide a tainter gate hoist chain which will operate instantly and satisfactorily, without galling or seizing, even though it has been subjected to maximum tainter gate loading over a prolonged period of inactivity.

Another object of the invention is to provide a tainter gate hoist chain which operates satisfactorily whether or not it is subjected to water immersion.

A still further object of the invention is to provide a method of providing a tainter gate hoist chain satisfactory to produce an improved product.

Other objects of the invention together with the foregoing are attained in the embodiment of the invention and in the practice of the method of the invention set forth in the accompanying description and illustrated in the accompanying drawing, in which:

The figure is a side elevation of a portion of tainter gate hoist chain constructed in accordance with the invention, one portion of the structure being broken away to show some of the interior, and another portion being illustrated in cross section on a central transverse plane.

The customary tainter gate hoist chain includes a number of chain pins 6 preferably fabricated of metal, usually a steel material, either high carbon steel or stainless steel, and formed in a generally circular cylindrical shape about a transverse axis 7. Each pin is received in the cooperating ends 8 and 9 of side links 11 and 12, the ends of the links 11 lying alongside the ends of the links 12 and all link ends encompassing the associated pin 6 in the usual way. The links 11 and 12 are preferably drop forged steel of appropriate composition. Often the materials of the pin and of the links are the same or quite similar in composition, but at other times they are relatively disparate, but in all instances are designed to operate directly upon each other. Similarity of materials does not appear to be detrimental herein.

Because of previous difficulties with galling and seizing under service conditions, we have provided a particular form of link and pin and a particular process of making them.

In the preferred circumstances, the pin 6 after an initial roughing or shaping operation is first subjected to a grinding step in which the exposed area 14 of the pin; that is, the entire, circular cylindrical outer area thereof, is ground to afford a smooth surface. The entire circular cylindrical area is ground to a bright or mirror finish; for example, this is sometimes specified as a No. 32 finish.

Following this finish operation, the pin 6 is then subjected to a grit blast operation utilizing sharp grit; for example, this is referred to as G-25 grit. The grit blasting is conducted so as to interrupt the otherwise smooth, mirror surface in a uniform fashion and so as to afford a consistently distributed pattern of pits or craters in the pin 6. The blasting operation is continued to afford a uniform, dull or matte appearance of the entire circular cylindrical surface of the pin 6. When the uniform grit blasting has been completed, the pin 6 has a surface made up of some portions, some tiny areas that are uniformly distributed and are relatively smooth, being the original ground surface without change. The pin 6 then has also relatively rough portions comprised of the various pits or cavities, separated or connected and resulting from the operation of the sharp grit blast. The appearance of the final composite surface is that of a matte. It does not reflect images and is roughly comparable in appearance to that of customary emery cloth of about No. 100.

Each of the links 11 and 12 after drop forging is provided with a bore surface 16 of circular cylindrical configuration of an appropriate size to receive the pin 6 in a journal relationship. The surface 16 may be considered sufficiently smooth when the boring is completed, or it may be also ground to afford a mirror finish comparable to a No. 32 finish. Substantially equally effective results have been had whether the surfaces 16 are ground or whether they are finely bored. In either case, the resulting surface 16 is classified as smooth.

As with the pin 6, the links after having been so finished as a first step are subsequently subjected on the surfaces 16 to a sharp grit blast with G-25 grit or comparable sharp grit to afford reasonably uniform but randomly distributed pits in the otherwise smooth surface comparable to the appearance of emery cloth of about No. 100. Stated differently, the final finish or appearance of the interior surfaces 16 of the links is substantially the same as that of the exterior surface of the pin 6. No attempt is made to have any particular differentiation between the surface appearance of the pins and the surface appearance of the link bores.

Following these operations, the links and pin are assembled substantially as shown in the figure and are thus located with the pin and links in journal relationship. There is some clearance between the facing surfaces of the parts, and into that clearance there is introduced a lubricant, conveniently molybdenum disulfide. The lubricant enters between the parts of the chain and assists in the relative rotation of the pin and links about the axis 7.

It is found in actual practice that with pins and links constructed as described herein, even though during long periods of inactivity the entire weight of the tainter gate hangs on the chain and even though there is a sufficient time lapse so that lubricant is virutally extruded from the otherwise effective clearance between the parts, still the pin and link combination does not gall or seize. This is now believed to be due to the fact that some lubricant is retained in the cavities in the pin and link surfaces, and may also be due to the fact that even though there may be virtually metal-to-metal contact between the smooth portions of the facing surfaces, the surface tension of the lubricant bodies occupying adjacent pits is sufficient to retain a minute film on the smooth portions. (If there is actual metal-to-metal contact with some metal deformation, minute initial movement is believed to restore the lubricant coating using lubricant from the adjacent pockets or pits.)

It is observed in practice that there is no lubricant remaining after a short time under load when the surfaces are entirely smooth and that galling results no matter what lubricant is initially utilized. The lubricant appears to be fugitive. Yet with the arrangement described herein, the lubricant is not fugitive or certainly is not entirely fugitive between the load bearing surfaces. The flexing operation of the chain, therefore, is instantaneous even though there have been long periods of inactivity.

The present construction has been sufficiently successful in actual practice so that the unit bearing loads of the bearing portions have been increased about fifty percent over the amount previously believed to be satisfactory. In practice, no difficulty has been had with bearing loads between the links and pins of approximately 12,000 pounds per square inch of bearing surface. The resulting tainter gate hoist chain remains flexible at all times, is operated with only the desired amount of power, and appears not to be affected by repeated operation over a short length of chain. A generally improved and reliable, satisfactory, light, relatively cheap product has been provided.

What is claimed is:

1. A tainter gate hoist chain comprising a pair of steel side links having aligned bores with interior circular cylindrical journal areas, a steel pin having an exterior circular cylindrical area adapted to be journalled in said areas of said links, all of said areas having surfaces defined by substantially uniformly distributed relatively smooth portions and relatively rough portions, said smooth portions being comparable to a finish provided by grinding and said rough portions being comparable to a finish by grit blasting, all of said surfaces having an appearance like that of emery cloth of about No. 100.

2. A tainter gate hoist chain as in claim 1 in which said areas in service support bearing loads of about 12,000 pounds per square inch.

3. A tainter gate hoist chain as in claim 1 in which said rough portions are effective under load to retain a lubricant such as molybdenum disulfide.

4. A method of providing a tainter gate hoist chain comprising the steps of providing a pair of steel links and a steel pin having interacting journal areas, first finishing all of the surface of said areas by grinding to afford substantially a mirror appearance, and then grit blasting all of the ground surface of said areas to provide uniformly distributed smooth portions and rough portions having a final appearance like that of emery cloth of about No. 100.

5. A method of providing a tainter gate hoist chain as in claim 4 including the step of assembling said links and said pin with said areas in journal relation to each other.

6. A method of providing a tainter gate hoist chain as in claim 5 including the step of lodging a lubricant such as molybdenum disulfide between said areas.

7. A method of providing a tainter gate hoist chain as in claim 4 in which said grinding results in about a No. 32 finish and said grit blasting is done with about G-25 grit.

References Cited

UNITED STATES PATENTS 2,056,597  10/1936  Blake _____ 74—257

G. P. CROSBY, *Assistant Examiner.*

CHARLES W. LANHAM, *Primary Examiner.*